R. E. SCHLEY.
POWER TRANSMITTING MECHANISM.
APPLICATION FILED DEC. 14, 1914.
1,231,070.
Patented June 26, 1917.
5 SHEETS—SHEET 1.
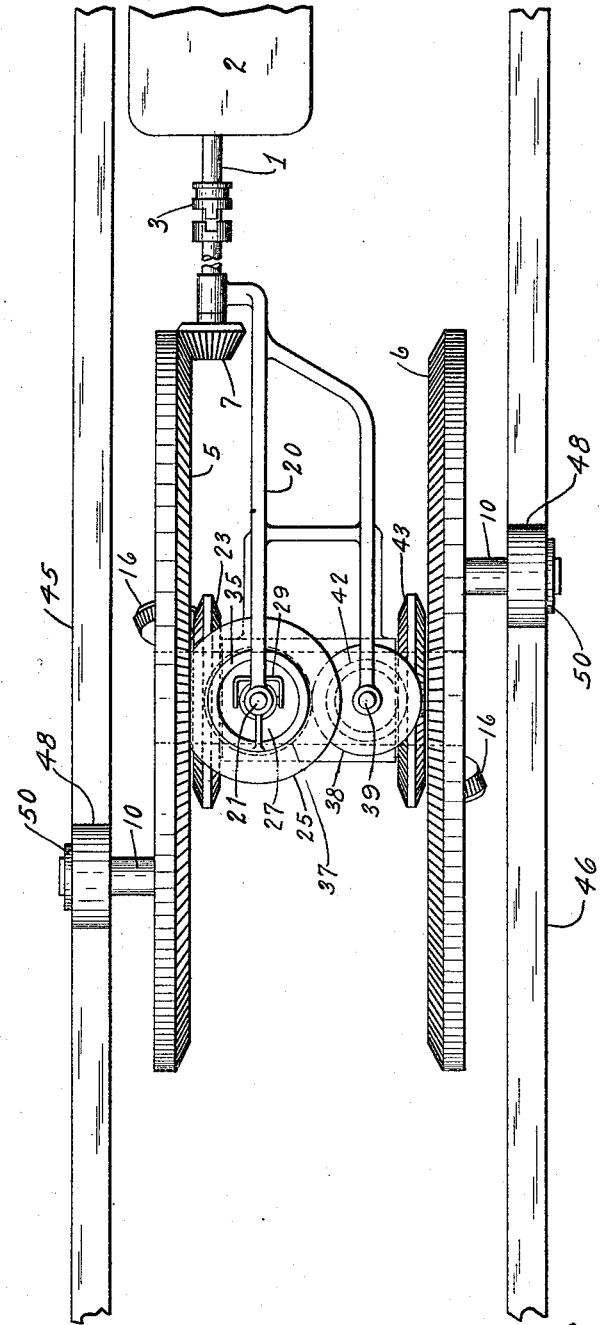
Witnesses
J. a. Otto
I. D. Bremer.
Inventor
Rudolph Edward Schley
By Erwin E. Wheeler
Attorneys

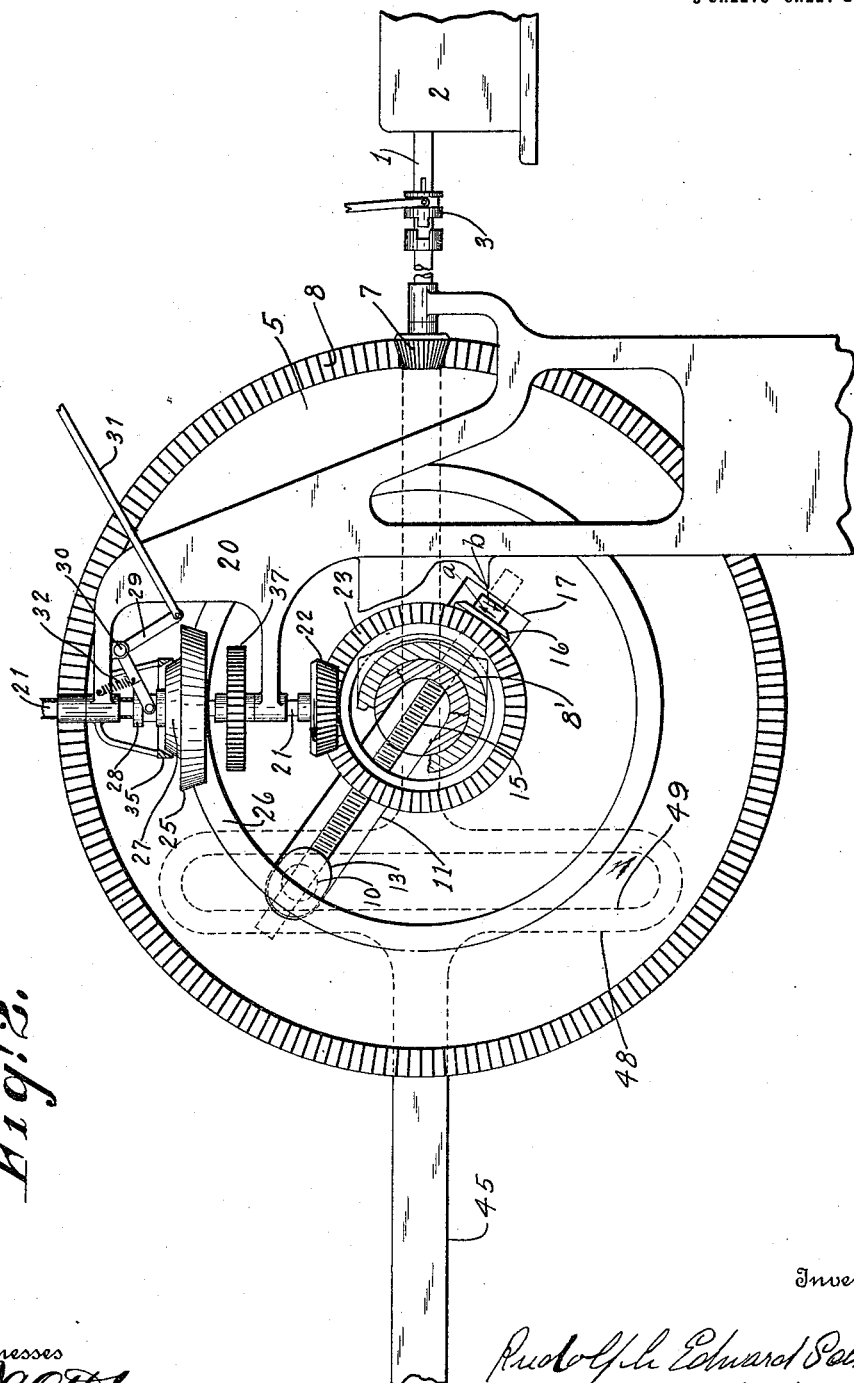

R. E. SCHLEY.
POWER TRANSMITTING MECHANISM.
APPLICATION FILED DEC. 14, 1914.
1,231,070.
Patented June 26, 1917.
5 SHEETS—SHEET 3.
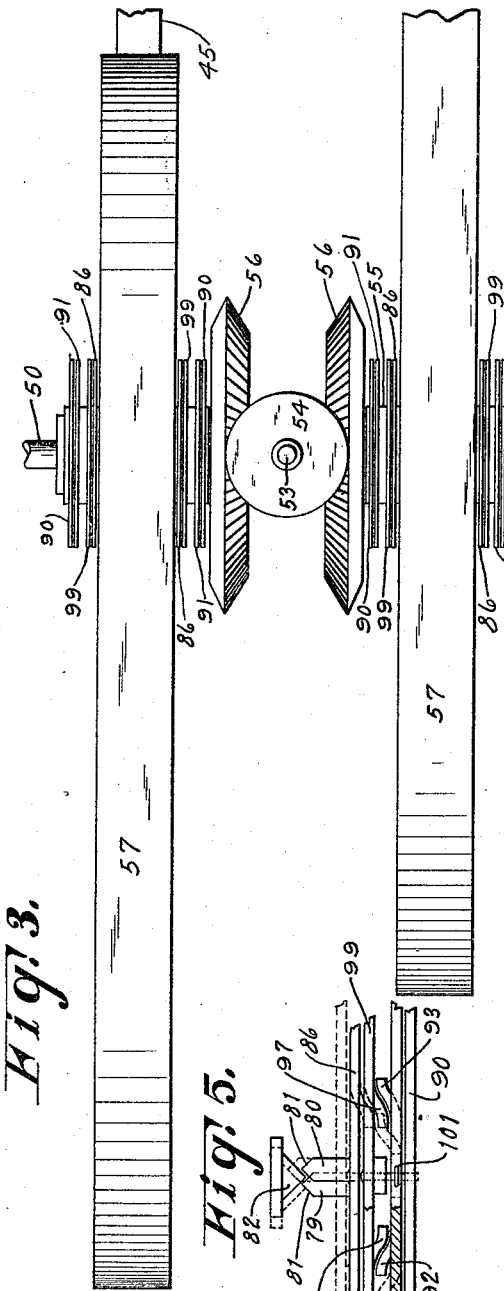
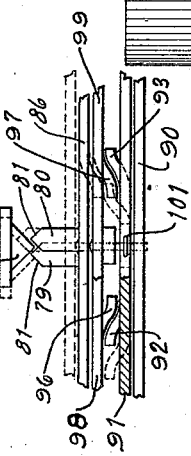
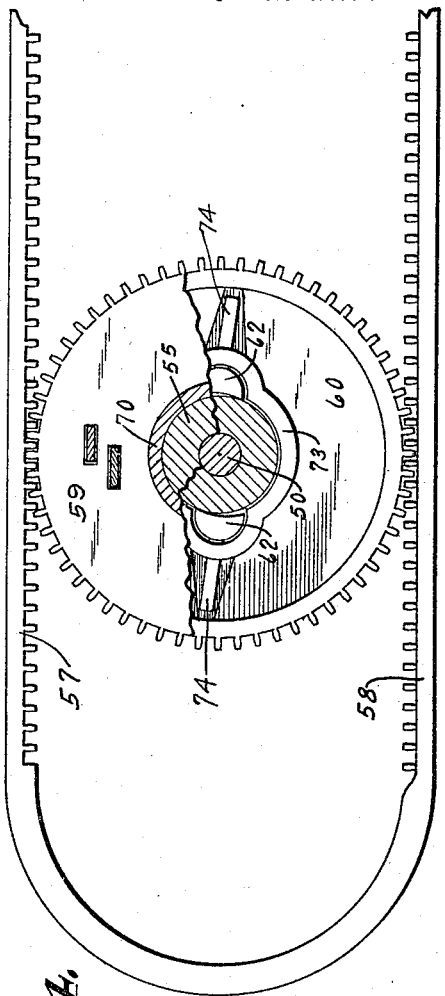

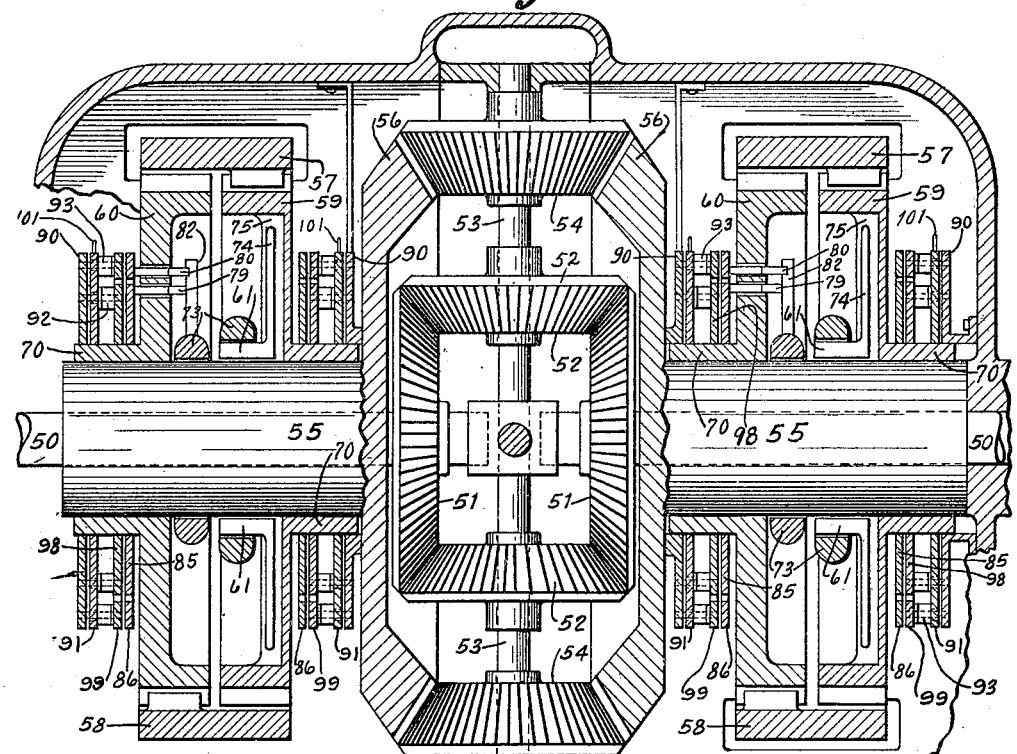

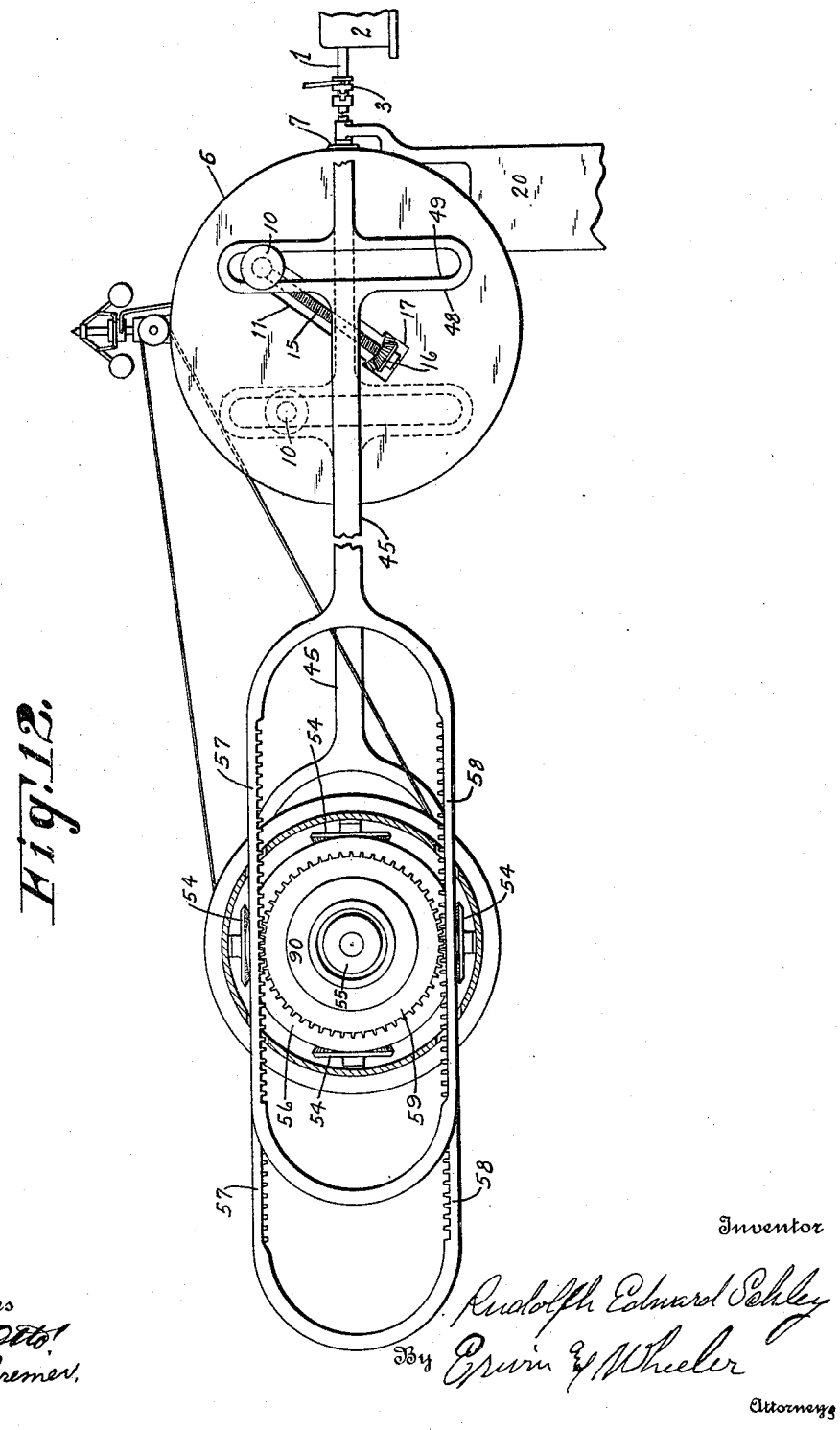

UNITED STATES PATENT OFFICE.

RUDOLPH EDWARD SCHLEY, OF BEAVER DAM, WISCONSIN.

POWER-TRANSMITTING MECHANISM.

1,231,070.  Specification of Letters Patent.  Patented June 26, 1917.

Application filed December 14, 1914. Serial No. 877,010.

*To all whom it may concern:*

Be it known that I, RUDOLPH EDWARD SCHLEY, a citizen of the United States, residing at Beaver Dam, county of Dodge, and State of Wisconsin, have invented new and useful Improvements in Power-Transmitting Mechanism, of which the following is a specification.

My invention relates to improvements in power transmitting mechanism.

The object of my invention is to dispense with the ordinary shifting clutches and gear wheels and provide a simplified motion transmitting mechanism in which the various gear wheels will be permitted to remain continuously in mesh and any desired number of speed changes effected through power derived from the motor and a portion of the transmitting mechanism, the speed changing operation being automatic, except for the manual adjustment of a simple set of controlling devices.

A further object of my invention is to provide means whereby the power may be transmitted without material loss, although converted for the purposes of transmission from rotary to reciprocatory and back to rotary motion in order to accomplish the object first above stated, and also for the purpose of providing for a large number of possible speed changes without increasing the complexity of the mechanism.

In the drawings—

Figure 1 is a plan view of the speed changing portion of my improved transmitting mechanism.

Fig. 2 is a side elevation of the same with one of the speed changing disks removed.

Fig. 3 is a plan view of the rear portion of the transmission mechanism, showing the differential gearing.

Fig. 4 is a detail view in side elevation of the means for transmitting motion to the driving member of the differential gear set.

Fig. 5 is a detail plan view of one of the clutches, and the clutch setting and reversing devices relating thereto.

Fig. 6 is a sectional view of the differential gear set and its driving connections, drawn to a vertical plane on the axis of the driving axle of a vehicle to which my invention is applied, but showing the axle members and some of the differential gear members in full.

Fig. 7 is a detail view of one set of the motion transmitting one way acting clutches in operative relation to the hub of the driving member of the outer differential gear set, said hub and the driving axle being shown in cross section.

Figs. 8, 9, 10 and 11 are detail views of the shifting mechanism for controlling the clutches, whereby said clutches may be adjusted to transmit motion in either direction, or in neutral.

Fig. 12 is a side elevation of the entire mechanism assembled, the driven shaft being broken away.

Like parts are identified by the same reference characters throughout the several views.

The main driving shaft 1 may be connected with any suitable motor 2, (preferably an internal combustion motor), a main clutch being employed at 3 as in all ordinary motor driven vehicles. The main shaft 1 is directly connected to drive a set of rotatable disks or beveled gear wheels 5 and 6 through the beveled pinion 7, which meshes with a set of teeth 8 on the beveled face of disk 5. Disk 6 receives its motion from disk 5 through shaft 8' upon which both disks are rigidly mounted. But disk 6 may also be provided with gear teeth, whereby it may be also connected directly with a source of power, if desired.

Each of the disks 5 and 6 carries a radially adjustable crank pin 10. The disks are preferably provided with radial slots 11, the slot in one disk extending at an angle of 90° to that in the other disk, and traveler blocks 13 are mounted to slide in the respective slots, the side walls of the slots serving as tracks. The crank pins 10 are mounted on these traveler blocks, and project laterally with reference to the outer faces of the respective disks. A screw 15, journaled in each disk, extends across the center thereof and longitudinally along the slot 11. It has threaded bearing in traveler block 13, and also carries a beveled pinion 16, the disk being provided with a recess or slot 17 to partially receive such pinion. These gear wheels, screws and traveler blocks afford means for adjusting the crank pins 10 radially from the disk centers outwardly.

The power to actuate gear wheels 16 may be derived from the disks by very simple and convenient manually adjustable mechanism. A bracket 20 extends between the disks, and a speed controlling shaft 21, journaled in this bracket, carries a beveled gear wheel 22 in mesh with a double beveled gear wheel 23, which is loose on shaft 8 and is also in mesh with the pinion 16 on disk 5. A friction wheel 25 on speed controlling shaft 21 is keyed thereto for movement along the shaft into and out of operative relation to friction ring 26 carried by disk 5. The friction wheel 25 carries a cone clutch 27 and a grooved hub 28, the latter being loosely engaged by a shifter lever 29 pivoted to bracket 20 at 30 and manually actuated in one direction from any suitable point by means of a rod or wire 31. A spring 32 connects this shifting lever with bracket 20 and tends to shift the lever in the opposite direction. Clutch 27 is adapted to engage a circular brake shoe 35 supported by bracket 20.

In the construction shown, the spring 32 tends to draw the working end of the lever 29, friction wheel 25, and clutch 27 upwardly, and this spring will therefore be effective to set the clutch unless lever 29 is held by the rod or wire 31 against the tension of the spring. In Fig. 2, the clutch 27 and friction wheel 25 are shown in neutral position with the clutch out of contact with the brake shoe and friction wheel 25 out of contact with ring 26. The rotation of disk 5 will therefore have no effect upon the adjustment of crank pin 10, for gear wheel 23 will turn with disk 5, and shaft 21 will run idle in the direction indicated by the arrow on gear wheel 22. But if clutch 27 is permitted to move from this neutral position to brake shoe 35, shaft 21 will be held against rotation, thereby also locking gear wheel 23 against rotation. Pinion 16 will now revolve about gear wheel 23 and be actuated thereby in the direction indicated by arrow (a) in Fig. 2, thus actuating the screw 15 to feed traveler 13 inwardly and decrease the radius at which crank pin 10 operates. If this adjusting operation is continued long enough, the crank pin may be moved to the axis of disk 5.

On the other hand, if lever 29 is actuated in the opposite direction from the neutral position shown in Fig. 2, the friction wheel 25 will be brought into operative contact with friction ring 26. The friction ring 26 being larger than the beveled gear wheel 23, it is obvious that shaft 21 will then be revolved about its own axis at an increased speed over that which is normally transmitted to this shaft from disk 5 through the gear wheels 16, 23 and 22, but in the same direction. This increased speed of shaft 21 will be transmitted through the gear wheel 22 to impart a relative rotation to gear wheel 23, causing the latter to revolve upon shaft 8 at a greater speed than disk 5. This increased or relative movement will of course be transmitted to gear wheel 16, causing the latter to revolve in the direction indicated by the arrow b and rotating the screw 15 in the direction to feed the traveler block 13 outwardly along the slot 11. This increases the radius of the crank pin and thus increases the length of stroke of a connecting rod or other parts connected therewith. In the construction illustrated, the friction wheel 25 is so proportioned to the diameter of the ring 26 that the gear wheel 23 will revolve at twice the speed of disk 5, when friction wheel 25 is in contact with ring 26. The outward radial adjustment will therefore be effected at substantially the same speed as the inward adjustment above described as occurring when the cone clutch 27 is set on brake shoe 35.

It is not necessary to duplicate all of the above mentioned mechanism for the purpose of radially adjusting the crank pin 10 on disk 6. I prefer to provide controlling shaft 21 with a spur gear wheel 37, in mesh with a spur gear wheel 38 carried by auxiliary controlling shaft 39. Shaft 39 is provided with a beveled gear wheel 42 corresponding with gear wheel 22 on shaft 21 and adapted to transmit motion through a double beveled gear wheel 43 to the pinion 16 carried by the screw 15 mounted on disk 6. The screws 15 on the respective disks will be so threaded that the motion thus transmitted will be effective to simultaneously move the traveler blocks 13 of both disks in the same direction, whether the adjustment be an inward movement or an outward movement. Instead of actuating rod 31 manually, it may be connected with any ordinary speed governor for automatic speed control, if desired.

In place of the ordinary connecting rods, I employ reciprocating bars 45 and 46 respectively. These bars are mounted to slide in suitable guides and are provided with slotted yokes 48, the slots 49 extending vertically and receiving the crank pins 10, the latter preferably being provided with anti friction rollers, which travel in said slots 49 of the respective yokes 48. Owing to the fact that the adjusting screws 15 extend at right angles to each other, it is obvious that when yoke 48 and connecting bar 45, actuated from disk 5, are in a rearwardly projected position, the corresponding yoke 48 and connecting bar 46, actuated from disk 6, will be in a forwardly projecting position, since the crank pin carried by one of the disks is given a lead of 90° over that carried by the other disk. This arrangement avoids the effect of dead centers and enables me to provide a continuous transmission of power to the rear wheels at substantially uniform speed, by employing a series of rack bars, ring gear wheels, one way acting clutches, and a double set of differential gears as hereinafter described. By employing slotted yokes 48, I equalize the movement in both directions from the axis upon which disks 5 and 6 revolve, whereas if an ordinary crank pin and connecting rod were used, the movement derived from the rear half turn, would exceed that derived from the forward half turn of the disks.

*The rear axle structure.*

The driving axles 50 are operatively connected with the driven members 51 of a set of gears which include the differential pinions 52, all assembled in the ordinary manner. But the shafts 53 of the differential pinions are extended and provided with an outer set of pinions 54. Sleeves 55, concentric with the driving axles, support an outer set of gear wheels 56, which mesh with the pinions 54 and with them constitute an outer differential gear set. One of these sleeves is actuated from the disk 5 and the other from the disk 6, through the connecting bars 45, upper and lower rack bars 57 and 58, gear rings 59 and 60, and one way acting clutches 61 and 62, which are connected to travel with the gear rings 59 and 60 respectively, and engage and actuate the sleeves 55 when moving in one direction, while moving freely over their surfaces in the other direction. The action of these clutches may, however, be reversed as hereinafter explained.

The rack bars, gear rings, clutches, and clutch controlling mechanisms which are operated from disk 6, are duplicates of those which are operated from disk 5, but are located on the opposite side of the double differential gear set above described. The gear rings 59 and 60 are provided with bearing hubs 70, which oscillate upon the sleeves 55 as the rack bars reciprocate. The upper rack bar 57 actuates gear ring 59 and when the clutches 61 are set the motion will be transmitted to sleeve 55 during the forward movement of this rack bar. The clutches 62, carried by gear ring 60, will be simultaneously set to actuate sleeve 55 in the same direction during the rearward movement of the lower rack bars 58. At the ends of the rack bar strokes, the transmission of motion would momentarily cease, were it not for the fact that the crank pin on disk 6 has a 90° lead over that on disk 5, and the rack bars which it actuates are therefore in full motion when the others are at rest, or approximately so. The outer set of differential gears 54 and 56 compensates for the variations in speed of the rack bars, and provides a substantially continuous transmission of power to the driving axles, the upper rack bars coming successively into action upon their respective gear rings during the forward stroke, and the lower ones during the rearward stroke.

*Reversing mechanism.*

It will be observed that the clutches 62 operate in recessed mountings 73 carried within the respective gear rings, and are provided with outwardly projecting arms 74 fitted to recesses 75 in the webs of said gear rings, whereby they may be oscillated by a relative rotation of their mountings 73 to reverse their action upon the sleeves which they engage. In Fig. 6 the clutches are shown in neutral position. It is obvious that if arm 74 is rocked in either direction from neutral, the clutch to which it is connected will engage and actuate the sleeve 55 in the direction in which it has been oscillated. But as these clutches are located in the oscillatory gear rings, special mechanism is required to adjust them and hold them in either position. This is accomplished by sets of axially movable pins 79 and 80 mounted in and extending through the webs of the gear rings and provided with beveled seating ends 81 bearing upon opposite sides of a V-shaped projection 82 carried by each mounting 73. When the pin 79 of any given set is pushed inwardly upon the beveled surface at one side of projection 82, said projection is moved laterally, to cause a slight rotative movement of the mounting. The other side of projection 82 will push pin 80 outwardly to retracted position. The converse will be true if pin 80 is pushed inwardly and it is therefore not possible for both pins to be simultaneously in either the clutch setting or retracted positions, although both may be simultaneously in neutral position.

In each set, pin 79 is rigidly connected with a supporting ring 85 and pin 80 is similarly connected with a ring 86 concentric with ring 85. Both rings are concentric with hub sleeve 70. An outer disk 90, fast on the casing 89, serves as an abutment for an oscillatory expander disk 91, which is provided with oppositely disposed sets of cam projections 92 and 93 located respectively in concentric circles on the inner face of the expander disk. The projections 92 and 93 are adapted to move upon the angular surfaces of counterpart sets of cam projections 96 and 97 on the outer faces of a pair of concentric clutch setting rings 98 and 99 respectively. The inner face of ring 98 bears upon the outer face of ring 85 and the inner face of ring 99 bears upon the outer face of ring 86 and the cam projections 92 and 93, and 96 and 97, are so located that when the spreader disk 91 is oscillated in one direction, pin setting ring 98 will be pushed inwardly on all sides, thereby forcing ring 85 and pin 79 inwardly to set clutch 62 in operation in one direction, which may be assumed to be the direction in which the clutch operates when adjusted as shown by dotted lines in Fig. 6. But if the spreader disk 91 is oscillated in the opposite direction, cam projections 93 and 97 will register with each other, thus forcing rings 99 and 86 inwardly, the latter carrying with it the pin 80, whereby this pin, pressing upon the beveled surface of projection 82 on the opposite side from that on which the pin 79 bears, will rotate mounting 73 in the opposite direction and thus set clutch 61 for engagement with sleeve 55 in the opposite direction from that in which the clutch engages the sleeve when it is set by means of pin 79. This last described clutch setting movement will of course force pin 79 to retracted position, this being possible for the reason that projections 92 on oscillatory disk 91 will now be out of registry with the projections 96 on the ring 98. Spreader disk 91 is oscillated in either direction by means of a clutch setting link rod 100 connected with a projecting ear 101 carried by spreader disk 91. The link rod 100 will be suitably connected up for operation from any suitable point.

In order to hold the rings 98 and 99 against rotation and thus maintain them in a fixed position with reference to the spreader disk 91, I preferably connect both of these rings with the abutment disk 90 by anchor pins 103 and 104 respectively. These pins are loosely entered in holes 105 in the rings 98 and 99. They pass through segmental slots 106 in the spreader disk 91, said slots being of sufficient length to permit the required oscillation of spreader disk 91 to either of its two clutch setting positions. I do not limit the scope of my invention to any specific form of clutch, clutch setting or reversing mechanism, but have illustrated and described the above mentioned mechanism simply as indicating one form of structure in which my invention may be embodied and which will permit a reversal of the clutches with a resulting reversal of the movement of the vehicle by a simple manual adjustment, which may be effected from the driver's seat.

It will be observed that while each of the rack bars 57 engage the corresponding gear ring 59 only, yet these rack bars are formed of sufficient width to overlap gear ring 60. Similarly, the lower rack bars 58 of each set have teeth which engage only the gear rings 60, although they have an untoothed portion which extends underneath the gear rings 59. Rack bars of this form are preferably used in order that the structure may be symmetrical, the untoothed portion of each rack bar also serving to strengthen the bar.

Briefly reviewing the operation of the device, it will be assumed that the clutches 61 are set for the transmission of power to the vehicle in a forward direction, the clutches connected with gear rings 59 engaging sleeves 55 during the forward movement of the rack bars, and the clutches connected with gear ring 60 engaging sleeves 55 during the rearward movement of the rack bars. The rotary movement of the disks 5 and 6 will with such adjustment be transmitted through the crank pins 10 to reciprocate the rack bars 45, one of said rack bars having a lead over the other, due to the 90° lead of the crank pin on disk 6 over that on disk 5. Assuming that the crank pins 10 are at the outer ends of the slots 11, a maximum speed will result, since the rack bars will have a maximum stroke. Their motion will be transmitted through the gear rings and reversible clutches to the sleeves 55, and the two sets of differential gearing to the driving axles 50. If it is desired to reduce the speed, the crank pins 10 will be moved inwardly toward the common axis of the disks 5 and 6 by setting the conical clutch 27 into frictional relation with brake shoe 35, thereby stopping the rotation of shaft 21 and causing a relative rotation of the double gear wheel 23 upon disk 5, the motion of which is transmitted to the crank pin through the gear wheels 16, screws 15 and traveler blocks 13. To again increase the speed, the friction wheel 25 will be adjusted inwardly into contact with gear ring 26, whereupon the shaft 21 will be rotated at increased speed over that which it has when in neutral position, thus causing a reverse movement of the adjusting gear wheels and screws.

In case it is desired to reverse the movement of the vehicle, it is merely necessary to oscillate spreader disks 91 in a direction to reverse the positions of pins 79 and 80. But this will ordinarily be done only after stopping the movement of the vehicle in its forward direction in order to avoid shocks and a possible slipping of the traction wheels.

It will be observed that the above described construction enables me to not only secure a multiplicity of speed changes, but I am also enabled to adjust the crank pins to the axle centers of the disks 5 and 6, whereupon if the clutches 61 and 62 are set in operative position in either direction, the driven shaft or shafts will be locked and if the invention is applied to a vehicle, the vehicle will be held against movement in a direction opposite that in which the vehicle is moving, the clutches performing the function of a brake or set of brakes. This is of especial advantage where my invention is applied to heavy trucks, which can be stopped and held upon an incline at any desired point. Thereafter, if it is desired to start the truck in an upward direction along the incline, ample power and an extremely slow starting movement may be secured by adjusting the crank pins at a slight distance from the axis of the disks 5 and 6, the radius being increased as the vehicle acquires motion. I do not limit the scope of my invention, however, to motor driven vehicles, nor to structures in which two differentially moving driven shafts 50 are employed. It is not essential to my invention whether these shafts 50 are separated, or whether they constitute one integral shaft with the inner differential gear set omitted. The inner differential gear set is employed wherever two driven shafts are used and where differential movement of such shafts is desired.

I claim—

1. The combination of a series of sets of differential gear members, including an initial and a final set, and having the driven members of the initial set operatively connected to actuate the driving member of the final set, and means for transmitting propulsive impulses successively to the initial set.

2. The combination of a series of sets of differential gear members, including an initial set having a plurality of driving members capable of differential movements, and a final set having a plurality of driven members capable of differential movements, and means for separately transmitting propulsive thrusts to the driving members of the initial set.

3. The combination of a series of sets of differential gear members, including an initial set having a plurality of driving members capable of differential movements, and a final set having a plurality of driven members capable of differential movements, and a set of reciprocatory power transmission members operatively connected to transmit motion in one and the same direction to the respective driving members of the initial gear set.

4. The combination of a series of sets of differential gear members, including an initial set having a plurality of driving members capable of differential movements, and a final set having a plurality of driven members capable of differential movements, a set of reciprocatory power transmission members operatively connected to transmit motion in one and the same direction to the respective driving members of the initial gear set, and crank mechanism for reciprocating said power transmission members.

5. The combination of a series of sets of differential gear members, including an initial set having a plurality of driving members capable of differential movements, and a final set having a plurality of driven members capable of differential movements, a set of reciprocatory power transmission members operatively connected to transmit motion in one and the same direction to the respective driving members of the initial gear set, and means for simultaneously reversing the direction of the motion thus transmitted.

6. The combination of a series of sets of differential gear members, including an initial set having a plurality of driving members capable of differential movements, and a final set having a plurality of driven members capable of differential movements, a set of reciprocatory power transmission members, and clutch connections for transmitting the motion of said power transmission members to the respective driving members of the initial gear set in one direction only.

7. The combination of a series of sets of differential gear members, including an initial set having a plurality of driving members capable of differential movements, and a final set having a plurality of driven members capable of differential movements, a set of reciprocatory power transmission members, clutch connections for transmitting the motion of said power transmission members to the respective driving members of the initial gear set in one direction only, and means for reversing said clutch connections to drive said gear members in the opposite direction.

8. The combination of a series of sets of differential gear members, including an initial set having a plurality of driving members capable of differential movements, and a final set having a plurality of driven members capable of differential movements, a set of reciprocatory power transmission members, clutch connections for transmitting the motion of said power transmission members to the respective driving members of the initial gear set in one direction only, and crank mechanism for actuating said reciprocatory power transmission members, said crank mechanism including a set of disks provided with radially adjustable cranks.

9. The combination with a set of disks, provided with radially adjustable crank pins, of a pair of opposing rack bars for each disk connected with each other and having slotted yoke connection with the crank pin carried by such disk, a set of oscillatory gear members, one engaging one rack bar of each pair at its upper side, and another engaging the opposing rack bar of each pair at its under side, a set of differential gear members, and clutches for transmitting the motion of the upper rack bars in one direction thereto and the motion of the lower rack bars in the other direction thereto, said clutches being adapted to successively engage the respective differential gear members in a direction for motion transmission thereto continuously in one direction for any given clutch adjustment.

10. A power transmitting mechanism, including a plurality of rotary differential members, a set of oscillatory ring gears, each provided with clutches for engaging one of said differential members in one direction of oscillation, and means for simultaneously adjusting said clutches to engage said differential members in the other direction of oscillation.

11. A power transmitting mechanism, including a plurality of rotary differential members, a set of oscillatory ring gears, each provided with clutches for engaging one of said differential members in one direction of oscillation, and means for simultaneously adjusting said clutches to engage said differential members in the other direction of oscillation, said adjusting means comprising a set of clutch adjusting wedges, rings connected with said wedges, a set of expander disks for operating said rings, and means for manually actuating one of said expander disks.

12. A power transmitting mechanism, including a plurality of rotary differential members, a set of oscillatory ring gears, each provided with clutches for engaging one of said differential members in one direction of oscillation, and means for simultaneously adjusting said clutches to engage said differential members in the other direction of oscillation, said adjusting means comprising a set of clutch adjusting wedges, rings connected with said wedges, a set of expander disks for operating said rings, and means for manually actuating one of said expander disks, said expander disks being provided with mutually engaging wedge shaped projections, whereby when one of said disks is oscillated the disks will be separated to actuate one or the other of said wedge supporting rings, substantially as described.

13. The combination of a set of connected rotary crank disks, crank pins mounted for radial adjustment on the respective disks, the crank pin on one disk being radially adjustable at an angle to the line of adjustment of the other pin, and a set of reciprocating power transmitting members having one way acting clutch connection with a common driven member, each having slotted yoke connection with one of said crank pins, and means for transmitting the motion of said disks to adjust said crank pins inwardly or outwardly with reference to the axis about which said disks revolve.

14. A power transmitting mechanism, including a set of oscillatory gear members, a set of reversible clutches inclosed in said gear members and having outwardly extending arms loosely socketed therein, a set of clutch actuating mountings adapted to be oscillated to shift the clutches in two directions, and means exterior to said gear members for oscillating said clutch setting mountings.

15. The combination with a set of differential gear members having two driving gears, and sets of alternately acting reciprocating actuating members, each member of each set having one way clutch connection with one of the driving gears of the differential gear set.

16. The combination with a set of differential gear members, including two driving gear members, of a reciprocating actuating device for each driving gear member of said set, said actuating device including a pair of rack bars connected with each other, one of said bars having one way acting clutch connection with a driving gear member, adapted to transmit motion to said member during the forward movement of the rack bar and the other of said rack bars having similar clutch connection with said gear member, adapted to transmit motion in the same direction during the rearward movement of said bar.

17. The combination with a set of differential gear members, including two driving gear members, of a reciprocating actuating device for each driving gear member of said set, said actuating device including a pair of rack bars connected with each other, one of said bars having one way acting clutch connection with a driving gear member, adapted to transmit motion to said member during the forward movement of the rack bar and the other of said rack bars having similar clutch connection with said gear member, adapted to transmit motion in the same direction during the rearward movement of said bar, said actuating devices being adapted to operate successively upon the respective driving gear members.

In testimony whereof I affix my signature in the presence of two witnesses.

RUDOLPH EDWARD SCHLEY.

Witnesses:
  LEVERETT C. WHEELER,
  IRMA D. BREMER.

Copies of this patent may be obtained for five cents each, by addressing the "Commissioner of Patents, Washington, D. C."